United States Patent
Xu et al.

(10) Patent No.: US 9,121,931 B2
(45) Date of Patent: Sep. 1, 2015

(54) MOBILE DEVICE LOCATION ESTIMATION

(71) Applicant: Research In Motion Limited, Waterloo (CA)

(72) Inventors: Jingwei Xu, Buffalo Grove, IL (US); Bruce Allen Bernhardt, Wauconda, IL (US); Arnold Sheynman, Northbrook, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 239 days.

(21) Appl. No.: 13/838,516

(22) Filed: Mar. 15, 2013

(65) Prior Publication Data

US 2014/0274116 A1 Sep. 18, 2014

(51) Int. Cl.
*H04W 24/00* (2009.01)
*G01S 11/06* (2006.01)
*G01S 5/14* (2006.01)

(52) U.S. Cl.
CPC .. *G01S 11/06* (2013.01); *G01S 5/14* (2013.01)

(58) Field of Classification Search
CPC ....... H04W 4/02; H04W 64/00; H04W 4/021; H04W 4/028; H04W 64/003; H04W 4/025; H04W 4/04; H04W 64/006; H04W 4/043; G01S 5/02; G01S 5/0252; G01S 5/0226; G01S 5/0242; G01S 5/0294; G01S 5/06; G01S 5/10; G01S 11/02; G01S 11/06; G01S 19/13; G01S 19/42; G01S 5/0063; G01S 5/0278; G01S 5/14; G01S 5/145
USPC .......... 455/404.2, 456.1, 456.2, 456.3, 456.5, 455/456.6, 457
See application file for complete search history.

(56) References Cited

U.S. PATENT DOCUMENTS

2012/0225663 A1* 9/2012 Gupta et al. ............... 455/456.1
2013/0095849 A1* 4/2013 Pakzad ...................... 455/456.1
(Continued)

FOREIGN PATENT DOCUMENTS

CN 101349746 A * 1/2009

OTHER PUBLICATIONS

Federal Communications Commission: Enhanced 9-1-1-Wireless Services; retrieved from http://transition.fcc.gov/pshs/services/911-services/enhanced911/Welcome.html on Jul. 18, 2013.
(Continued)

*Primary Examiner* — Magdi Elhag
(74) *Attorney, Agent, or Firm* — Fish & Richardson P.C.

(57) ABSTRACT

The present disclosure is directed towards mobile device location estimation, and more particularly, to indoor mobile device location estimation. One computer-implemented method includes using indoor floor map, indoor wireless local area network (WLAN) access point (AP) location map and constructing a pseudo-AP map associated with an indoor location, wherein the pseudo-AP map includes at least one pseudo-AP, each pseudo-AP a function of at least a radio-frequency (RF) signal strength indication (RSSI) associated with at least one actual AP associated with the indoor location; estimating a mobile device location within the boundaries of the indoor location using at least one actual AP associated with the indoor location, and at least one pseudo-AP from the pseudo-AP map associated with the indoor location; and using the estimated mobile device location for indoor navigation within the indoor location.

19 Claims, 11 Drawing Sheets

(56) References Cited

U.S. PATENT DOCUMENTS

| | | | | |
|---|---|---|---|---|
| 2013/0267257 | A1* | 10/2013 | Palanki et al. | 455/456.5 |
| 2013/0273938 | A1* | 10/2013 | Ng et al. | 455/456.1 |
| 2013/0317944 | A1* | 11/2013 | Huang et al. | 705/26.61 |
| 2014/0018096 | A1* | 1/2014 | Jagannath | 455/456.1 |
| 2014/0218241 | A1* | 8/2014 | Bernhardt et al. | 342/451 |
| 2015/0035858 | A1* | 2/2015 | Yang et al. | 345/629 |

OTHER PUBLICATIONS

National Geospatial Intelligence Agency: DMA Technical Manual 8358.1 Table of Contents; retrieved from http://earth-info.nga.mil/GandG/publications/tm8358.1/toc.html on Jul. 18, 2013.

* cited by examiner

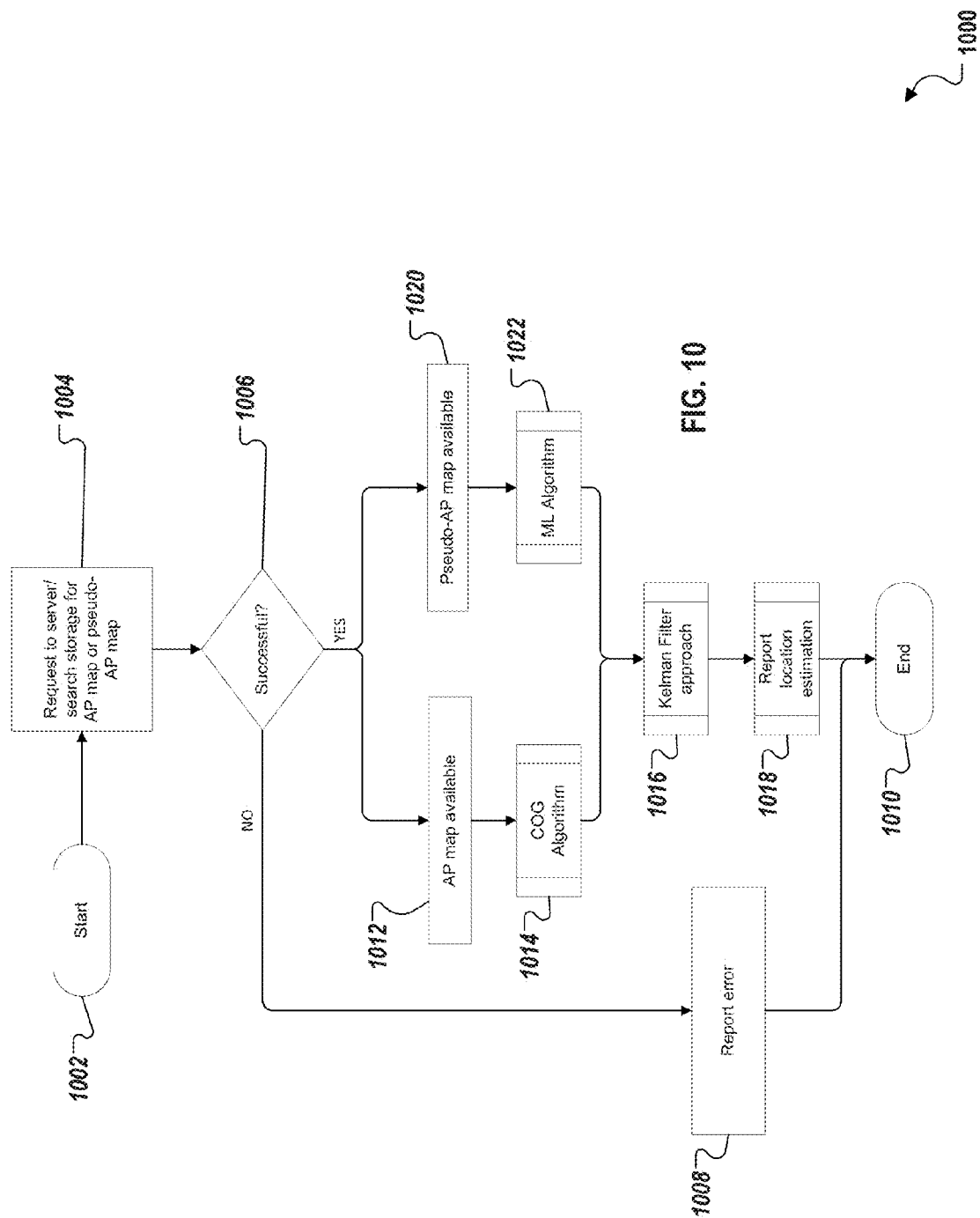

MOBILE DEVICE LOCATION ESTIMATION

FIELD

The present disclosure is directed towards mobile device location estimation, and more particularly, to indoor mobile device location estimation.

BACKGROUND

Mobile devices may include location based service (LBS) applications and E-911 services. Under E-911 service program phase II, the Federal Communication Commission (FCC) requires that mobile device location estimation, whether outdoor or indoor, be within a general accuracy range, for example fifty (50) to three-hundred (300) meters, depending on the type of technology used.

SUMMARY

The present disclosure is directed towards mobile device location estimation, and more particularly, to indoor mobile device location estimation. One computer-implemented method includes using indoor floor map, indoor wireless local area network (WLAN) access point (AP) location map and constructing a pseudo-AP map associated with an indoor location, wherein the pseudo-AP map includes at least one pseudo-AP, each pseudo-AP a function of at least a radio-frequency (RF) signal strength indication (RSSI) associated with at least one actual AP associated with the indoor location; estimating a mobile device location within the boundaries of the indoor location using at least one actual AP associated with the indoor location, and at least one pseudo-AP from the pseudo-AP map associated with the indoor location; and using the estimated mobile device location for indoor navigation within the indoor location.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features:

A first aspect, combinable with the general implementation, the estimated mobile device location is used in conjunction with an environment map representing the indoor location for indoor navigation.

A second aspect, combinable with the general implementation, Global Navigation Satellite System (GNSS) RF signals are unavailable.

A third aspect, combinable with the general implementation, the pseudo-AP map is arranged in a grid pattern.

A fourth aspect, combinable with the general implementation, the estimated mobile device location is calculated from a function of AP location and/or pseudo APs locations.

A fifth aspect, combinable with the general implementation, each pseudo-AP is a function of a basic service set identification (BSSID) associated with a particular actual AP.

A sixth aspect, combinable with the general implementation, a pseudo-AP is described as the probability distribution that the BSSID of the particular actual AP is at a particular location and a radio signal strength indicator probability distribution for the particular actual AP at the particular location.

A seventh aspect, combinable with the general implementation, an additional weighting factor is utilized representing a function of at least the mobile device's last estimated location, moving direction, and velocity based upon an analysis of the at least one pseudo-AP.

A eighth aspect, combinable with the general implementation, the estimated mobile device location provided as the initial position estimation for an indoor navigation system.

A ninth aspect, combinable with the general implementation, the estimating the mobile device location includes at least one of a weighting factor dependent upon and calibrated based on the indoor location environment, a scaling factor, or a compensation correction function to correct for physical signal path loss error.

A tenth aspect, combinable with the general implementation, estimating the mobile device location includes using Kalman Filtering to calculate a closed loop mobile device location estimation.

The subject matter described in this specification can be implemented in particular implementations so as to realize one or more of the following advantages. First, enhanced accuracy indoor location estimation permits service providers to satisfy, for indoor-based locations, Federal Communication Commission (FCC) requirements that location estimation must be within a general fifty (50) to three-hundred (300) meter accuracy range depending on the type of technology used. Second, indoor location estimation methods leverage commonly available radio frequency (RF) signals, including cellular, wireless local area network (WLAN), Bluetooth, near field communication (NFC) technologies, and/or other suitable RF signals. Third, the commonly available RF signals can also be used with additional user equipment sensor technologies to further improve indoor location estimation accuracy. Fourth, indoor location estimation can be performed without the use of Global Navigation Satellite System (GNSS) technology signals and associated location tags. Fifth, the described system and/or method can be adapted for an outdoor environment with little change. Other advantages will be apparent to those skilled in the art. The details of one or more implementations of the subject matter of this specification are set forth in the accompanying drawings and the description below. Other features, aspects, and advantages of the subject matter will become apparent from the description, the drawings, and the claims.

DESCRIPTION OF THE DRAWINGS

FIG. 10 is a high-level flow chart of a method for mobile device location estimation.

Like reference numbers and designations in the various drawings indicate like elements.

DETAILED DESCRIPTION

Figure 1:
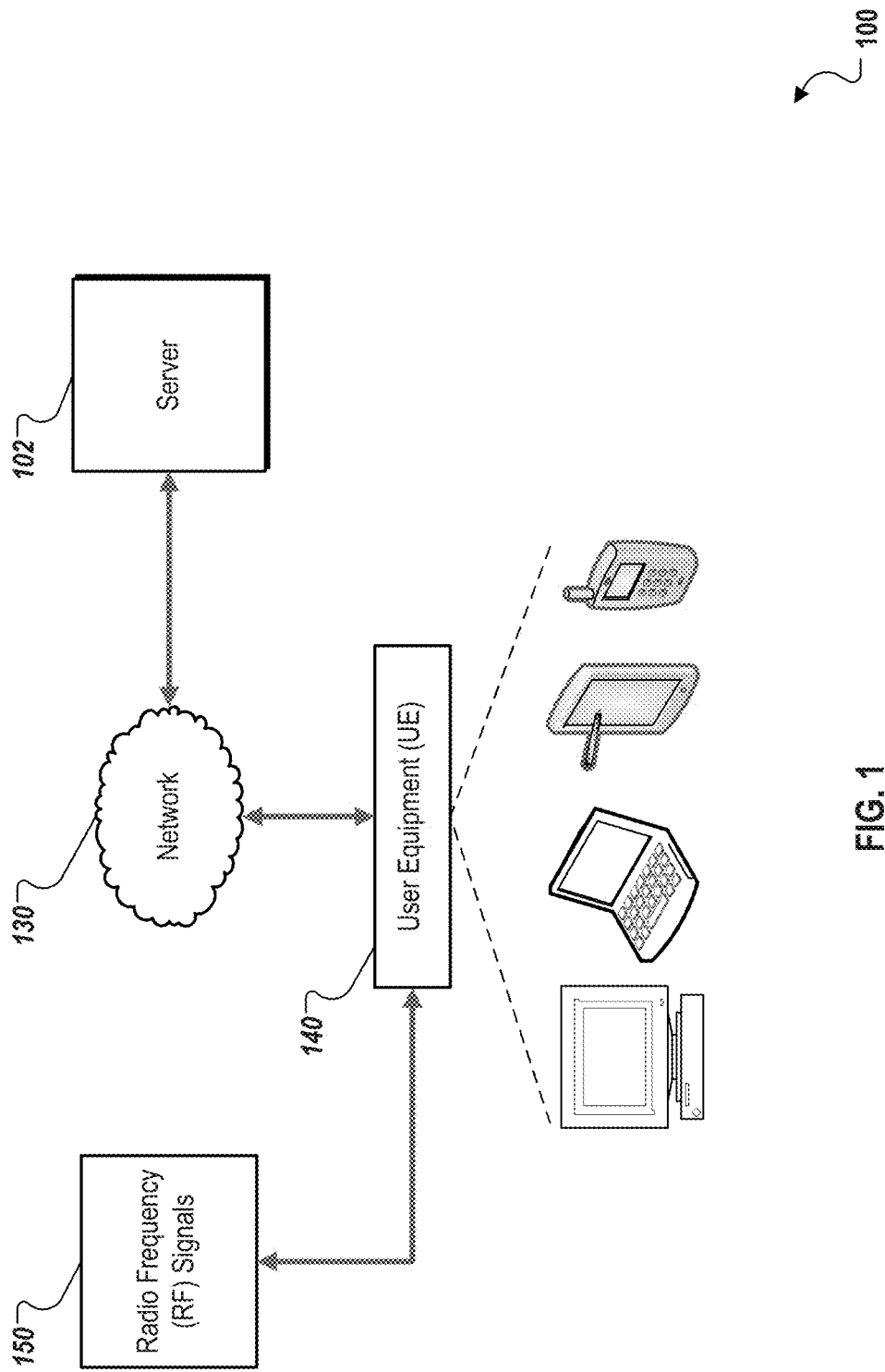
FIG. 1 is a block diagram illustrating an example mobile communication system 100 directed towards mobile device location estimation, and more particularly, to indoor mobile device location estimation according to one implementation.

The following description is presented to enable any person skilled in the art to make and use the invention, and is provided in the context of a particular application and its requirements. Using a multi-stage initialization and real-time estimation method, example computing systems can present available indoor environment maps on a mobile device, measure and analyze available non-Global Navigation Satellite System (GNSS) radio frequency (RF) signals, and estimate a mobile device's indoor location against the available indoor environment maps. Various modifications to the disclosed implementations will be readily apparent to those skilled in the art, and the general principles defined herein may be applied to other embodiments and applications without departing from scope of the disclosure. Thus, the present disclosure is not intended to be limited to the described and/or illustrated implementations, but is to be accorded the widest scope consistent with the principles and features disclosed herein. Terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosure herein described.

Mobile devices provide benefits to users in multiple areas, including education, gaming, financial management, shopping, navigation, and the like. An important decision factor considered when purchasing a mobile device is availability and functionality of location based service (LBS) applications and an enhanced "911" emergency (E-911) service. Under E-911 service program phase II, the Federal Communication Commission (FCC) requires that mobile device location estimation must be within a general fifty (50) to three-hundred (300) meter accuracy range depending on the type of technology used. Determining mobile device locations within this accuracy range requires precise location estimation.

For outdoor positioning, GNSS technology, such as the Global Positioning System (GPS), is relatively mature and can provide moderate accuracy to meet customer needs for mobile device LBS applications. As other GNSS technologies, such as Beidou, Galileo, GLONASS, Compass, and the like are put into commercial service in the near future, it is expected that, in most cases, the combination of these GNSS technologies will provide accurate location estimation for outdoor mobile device location estimation.

However, for indoor LBS applications, GNSS technology may not be accurate or available. The GNSS signal may be too weak within a structure to be used to provide a stable indoor location estimation solution for a mobile device. An alternative method to the use of GNSS signals is to utilize different kinds of radio frequency (RF) signals to estimate the mobile device's location. These RF signals can include cellular, wireless local area network (WLAN), Bluetooth, near field communication (NFC) technologies, and/or other suitable RF signals. It is expected that through the use of such alternative signal methods, that mobile device location accuracy can be increased from an overall range of approximately fifty (50) meters down to several meters or less. The most widely used RF signal for indoor location estimation is the WLAN signal because it has been widely deployed in areas like residences, offices, restaurants, malls, and airports.

Many received WLAN radio signal strength (RSS)-based indoor location estimation methods rely on building an empirical signal propagation model using measurement data collected from field surveys. Methods of this type include the fingerprint method, the statistical method, the artificial intelligent method, and the radio propagation model approach. However, most, if not all, of these and other similar methods require a GPS location tag associated with each radio signal data vector in the field survey stage. Without a GPS (or some similar method of deriving the precise location) location tag, these methods cannot be used. In this disclosure, a system solution and method for indoor mobile device location estimation is proposed in which GNSS location estimations are not obtainable. In some instances, the location estimation can be used for indoor navigation, for instance, with mobile devices and navigation applications for use within shopping malls, office buildings, hotels, convention centers, museums, stadiums, high rises, etc. The method and approach may also be applied to an outdoor environment with little change.

FIG. 1 is a block diagram illustrating an example mobile communication system (MCS) 100 directed towards mobile device location estimation, and more particularly, to indoor mobile device location estimation according to one implementation. In some implementations, MCS 100 can include one or more servers 102, one or more instances of user equipment (UE), and/or RF signals 150. The following described computer-implemented methods, computer-readable media, computer systems, and components of the example mobile communication system 100 provide functionality through one or more graphical user interfaces (GUIs) associated with the one or more servers 102 and/or one or more UEs 140. The GUIs provide an efficient and user-friendly presentation of data provided by or communicated within the example mobile communication system 100.

The server 102 is an electronic computing device operable to receive, transmit, process, store, or manage data and information associated with the MCS 100. For example, the server 102 can receive requests, analyze, and/or process requests for indoor environment maps from a UE 140, transmit the requested indoor environment maps to the UE 140; receive, process, and/or store RF signal data from the UE 140; estimate, store, and/or transmit indoor UE 140 locations, and other suitable operations consistent with this disclosure. According to some implementations, server 102 may also include or be communicably coupled with an e-mail server, a web server, a caching server, a streaming data server, and/or other suitable server.

Figure 2:
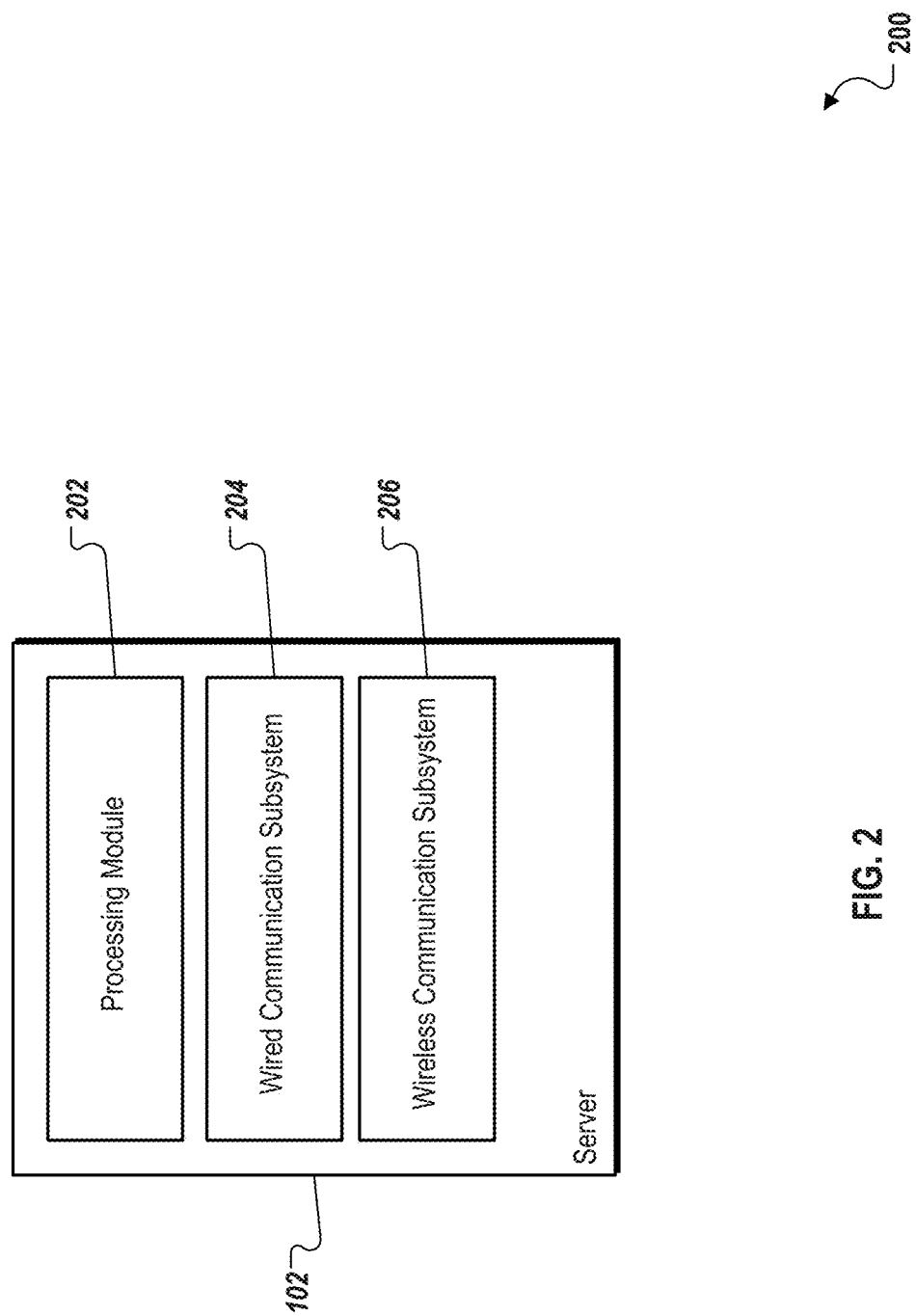
FIG. 2 is a block diagram illustrating an example server apparatus according to one implementation.

FIG. 2 is a block diagram illustrating an example server 102 apparatus 200 according to one implementation. Server 102 can include a processing module 202, a wired communication subsystem 204, a wireless communication subsystem 206, and an I/O interface 210. The processing module 202 can include one or more processing components (alternatively referred to as "processors" or "central processing units" (CPUs)), either hardware and/or software, operable to execute software, modules, instructions, and the like to provide indoor mobile device location estimation. The processing module 202 can also include other auxiliary components, such as random access memory (RAM), read only memory (ROM), secondary storage (for example, a hard disk drive or flash memory). In some implementations, the RAM, ROM, and/or secondary storage can store the above-describe software, modules, and/or instructions to provide indoor mobile device location estimation. In some implementations, the RAM and/or the secondary storage can be used by the server 102 to store received raw and/or processed RF signals 150 from UE 140. The server 102 can also store UE 140 device profiles, security information, historical data, and/or other suitable data. The processing module 202 can execute certain instructions and commands to provide wireless or wired I/O communication between the server 102 and one or more server 102, UEs 140, and/or other components (not illustrated) of the MCS 100 using the wired communication subsystem 204 or a wireless communication subsystem 206. A skilled artisan will readily appreciate that various other components can also be included in the example network node 200. In some implementations, the server 102 can act as a processing manager to manage/coordinate mobile device location estimations/data with one or more servers 102 and/or UEs 140. In some implementations, server 102 functionality can be performed by one or more UEs 140 (described below).

The network 130 of the MCS 100 encompasses any suitable wireless communication network. For example, network 130 can be a cellular network, such as a long term evolution (LTE) network embodying a 3GPP LTE standard. In some implementations, the network 130 can also include WLAN and/or other suitable wireless networks operating independently and/or in conjunction with the cellular or other network. A skilled artisan will readily appreciate that embodiments described herein can be adapted for any suitable wireless network and/or system.

The user equipment (UE) 140 can refer to wireless and similar devices or other User Agents ("UA") that have telecommunications capabilities. In some embodiments, a UE 140 may refer to a mobile, wireless device. The term "UE" may also refer to devices that have similar capabilities, but that are not generally transportable, such as desktop computers or set-top boxes with wireless network communication capabilities. Examples of UEs 140 include, but are not limited to, a mobile phone, a smart phone, a telephone, a television, a remote controller, a set-top box, a computer monitor, a computer (including a tablet computer such as a BLACKBERRY PLAYBOOK tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, Such a UE 140 might include a device and its associated removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE 140 might include the device itself without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

Figure 3:
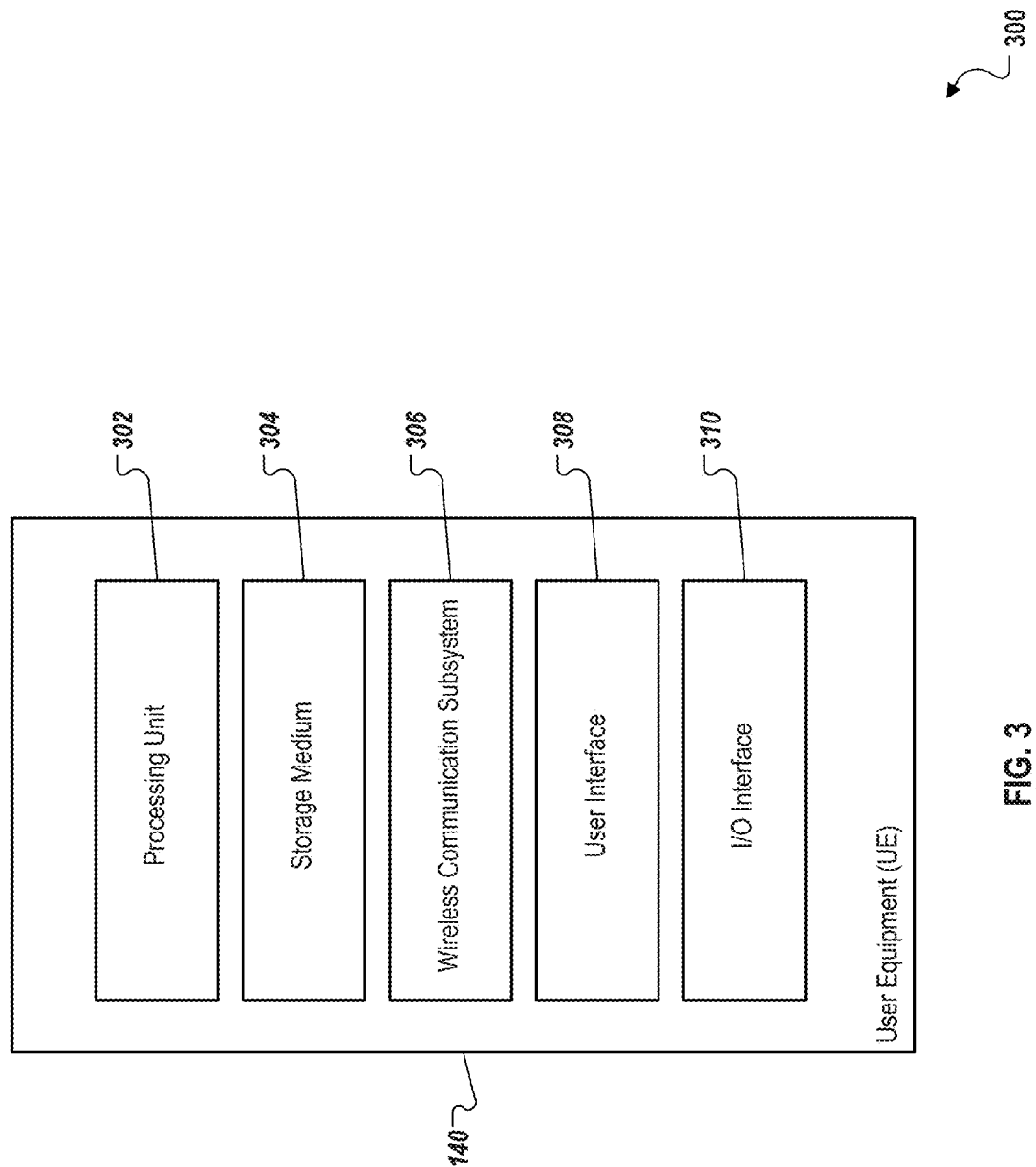
FIG. 3 is a block diagram illustrating an example user equipment (UE) apparatus according to one implementation.

FIG. 3 is a schematic illustrating an example user equipment (UE) 140 apparatus according to one implementation. The example UE 140 includes a processing unit 302, a computer readable storage medium 304 (for example, ROM or flash memory), a wireless communication subsystem 306, an interface 308, and an I/O interface 310.

In some implementations, the processing unit 302 can process software, modules, instructions, and the like, to perform mobile device location estimations similar to those as performed by the server 102. In some implementations, the server 102 and the UE 140 can work cooperatively to determine mobile device location estimations. In some implementations, the UE 140 can act as a processing manager to manage/coordinate mobile device location estimations/data with one or more servers 102 and/or UEs 140.

The wireless communication subsystem (WCS) 306 may be configured to provide wireless communications for data information or control information provided by the processing unit 302. The WCS 306 can include, for example, one or more antennas, a receiver, a transmitter, a local oscillator, a mixer, and a digital signal processing (DSP) unit. In some implementations, the WCS 306 can support multiple input multiple output (MIMO) transmissions. In some implementations, the WCS 306 can determine the strength, direction, source, and/or other suitable measurement criteria for RF signals detected by the wireless communication subsystem 306 needed by the described systems, methods, and/or algorithms.

The interface 308 can include, for example, one or more of a screen or touch screen (for example, a liquid crystal display (LCD), a light emitting display (LED), an organic light emitting display (OLED), a micro-electro-mechanical system (MEMS) display), a keyboard or keypad, a trackball, a speaker, a camera, and a microphone. In some implementations, The I/O interface 310 can include, for example, a universal serial bus (USB) or equivalent interface/port. A skilled artisan will readily appreciate that various other components can also be included in the example UE device 140. The I/O interface 310 may be a hardware and/or software interface that permits/facilitates communication between two UE devices 140, such as an NFC system, optical link, or other suitable I/O interface.

In some implementations, a first UE may indicate to a second UE that the first UE has data to send to or would like to receive data from the second UE. For example, a first UE may transmit an explicit radio link protocol indication either to the second UE or to a network node requesting an inter-device session with a second UE in order to directly share RF signal data, location estimations, and/or other suitable data. Alternatively, the first UE may simply send data to a network address associated with the second UE via the network 130, such as through a network 130 network node. In a typical implementation, the second UE and/or the network node will determine whether or not to attempt establishment of an inter-UE device session. In other implementations, a UE 140 can communicate directly (not illustrated) with another UE 140 and/or the server 102 either wholly or partially without the use of network 130. A skilled artisan will readily appreciate the various available methods capable of use by a UE to communicate with a mobile device network, such as network 130, or directly with another UE/server 102, including use of reference signals to determine whether two UEs are in-range to directly communicate, timing window and channel state information (CSI), feedback messages, and the like.

If a GNSS signal, for example a GPS signal, is available (near a window or doorway, etc.), the MCS 100 will use the GNSS signal to the extent that it can, that is either exclusively or in conjunction with alternative RF signals, to estimate a mobile device location. In some implementations, available known wireless access point (AP) location information and/or available GNSS signals can also be used to provide a location estimation solution using a triangulation method or a center of gravity (COG) type method. Typically, however, sufficient AP location information and/or GNSS signals are not available to perform location estimation.

Assuming that AP location information is unavailable or insufficient, and that the GNSS signal is not available/too weak to be used to provide a sufficient mobile device location estimation, the MCS 100 will attempt to estimate the mobile device location based on the alternative RF signals, such as WLAN signals from one or more wireless access points (APs), and associated media access control (MAC) addresses (or basic service set identification (BSSID)). Alternative RF signals will be discussed in terms of WiFi signals received from APs from this point forward, but skilled artisans will appreciate that equivalent data obtained from Bluetooth, NFC, cellular, or other suitable RF signals can be substituted and used to perform the described UE 140 location estimations.

Alternative available RF signals can be measured by the UE 140 and a determination of at least basic service set identification (BSSID) and received signal strength indication (RSSI) levels of the RF signals can be performed. In the case of RF signals received from one or more AP(i) in a WLAN network system, equation (1) represents the combined measured RSSI and BSSID data for each available/measured AP(i).

$$\{(RSSI_i, BSSID_i)\}_{i=1}^n \quad (1)$$

where BSSID represents the MAC address of a particular actual AP(i) obtained by the UE 140.

I. Power Range Algorithm

The estimated UE 140 location (Loc) is then provided by equation (2):

$$Loc = \{Latitude, Longitude, Altitude\} \quad (2)$$

In the case where the location of all APs is known for a particular environment, a power range algorithm can be used to efficiently estimate a UE 140 location in relation to the environment. Equations (1-3) describe the calculations performed to determine each of a Latitude, Longitude, and Altitude value for a UE 140's estimated location.

$$Latitude = (\Sigma_{i=1}^n Latitude(i) * \beta * (RSSI(i)/Max\_Power)^\alpha) / (\Sigma_{i=1}^n (RSSI(i)/Max\_Power)^\alpha) \quad (1)$$

$$Longitude = (\Sigma_{i=1}^n Longitude(i) * \beta * (RSSI(i)/Max\_Power)^\alpha) / (\Sigma_{i=1}^n (RSSI(i)/Max\_Power)^\alpha) \quad (2)$$

$$Altitude = (\Sigma_{i=1}^n Altitude(i) * \beta * (RSSI(i)/Max\_Power)^\alpha) / (\Sigma_{i=1}^n (RSSI(i)/Max\_Power)^\alpha) \quad (3)$$

Here, n is the number of APs with a known location. Max_Power is the maximum power capable of being transmitted from a particular AP(i) transmitter. RSSI is a received WiFi radio signal strength associated with the particular AP(i). In some implementations, the reported RSSI value can be in a logarithmic format (dB) or a linear power format (W) measured at a location to be estimated. Alpha ($\alpha$) is a weight factor dependent and calibrated based on a particular indoor environment and the distribution of the AP location map. Beta ($\beta$) is scaling factor related to the indoor environment. Both alpha and beta are used to indicate the fading of one or more RF signals over a particular distance. In some instances, building materials, walls, obstructions, other RF signal interference, and the like can be taken into consideration when determining the value of alpha and beta. For example, based on RSSI, alpha and beta could be set to a smaller value for a residential environment (more walls) as opposed to a higher value for a parking structure or industrial-type building (a more open area). Note that $\alpha$ and $\beta$ remain consistent among the equations for Latitude, Longitude, and Altitude. In some implementations, the estimated location can be represented by values of any other coordinate system such as a Cartesian, Polar, Universal Transverse Mercator (UTM), and/or Universal Polar Stereographic (UPS) coordinate system. For purposes of this disclosure, the WGS84 format is used merely for convenience to define location and is not meant to be limiting in any way. Location coordinates can be easily transformed among different coordinate systems.

Figure 4A:
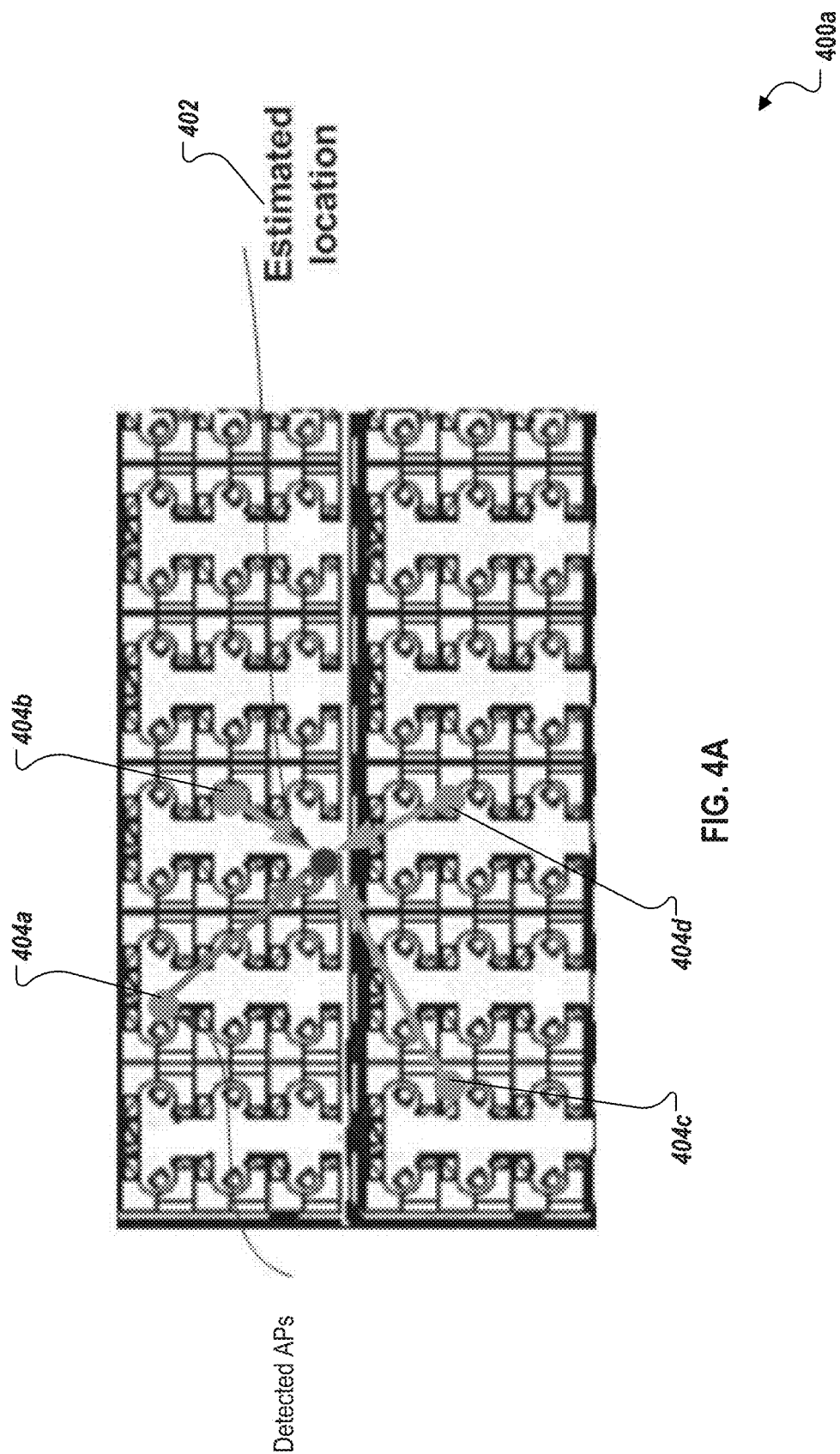
FIG. 4A illustrates an example location estimation provided by the use of a power range algorithm technique according to one implementation.
Figure 4B:
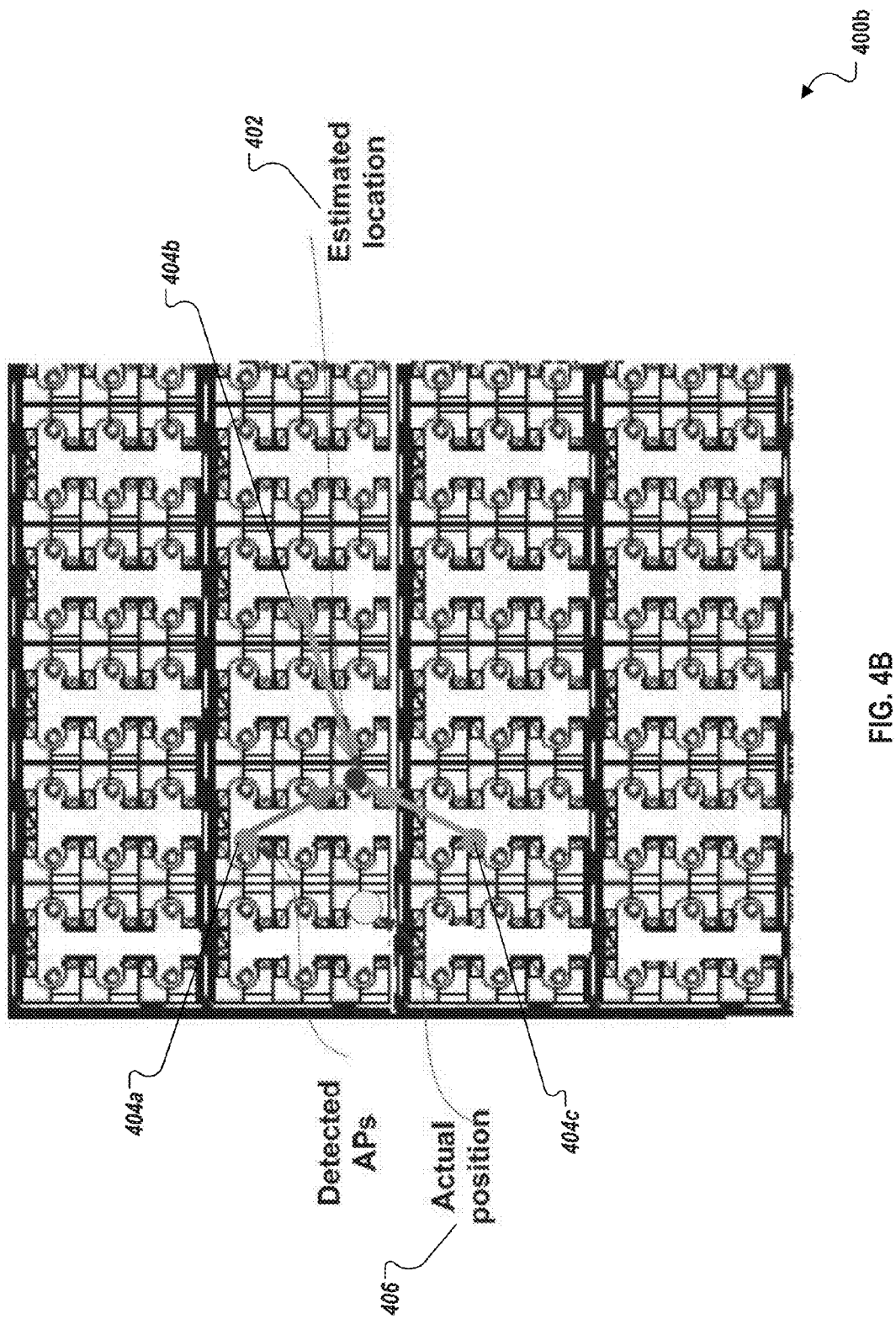
FIG. 4B illustrates an example indoor location estimation 400b provided by the use of a power range algorithm where all detected access points are to one side of an actual location according to one implementation.

FIG. 4A illustrates an example indoor location estimation 400a provided by the use of a power range algorithm technique according to one implementation. Here, estimated location 402 (latitude, longitude, altitude) is calculated using data obtained and/or determined from known locations of example detected APs 404a-404d. In some cases, a location bias is introduced if all the detected APs are in actuality on one side of the actual UE 140 location. FIG. 4B illustrates an example indoor location estimation 400b provided by the use of a power range algorithm where detected access points are all to one side of an actual location of a UE 140. In some implementations, the detected AP "bias" can cause large location estimation errors. As seen in FIG. 4B, the actual UE 140 location is to the left of all detected APs 404a-404c. The estimated location 402 is skewed to the right due to the bias introduced by the locations of the detected APs 404a-404c. Therefore, a hybrid location estimation method would be useful to improve estimation accuracy and to remove the bias where it exists.

II. Hybrid Location Estimation Algorithm (Using Pseudo-APs)

Figure 5:
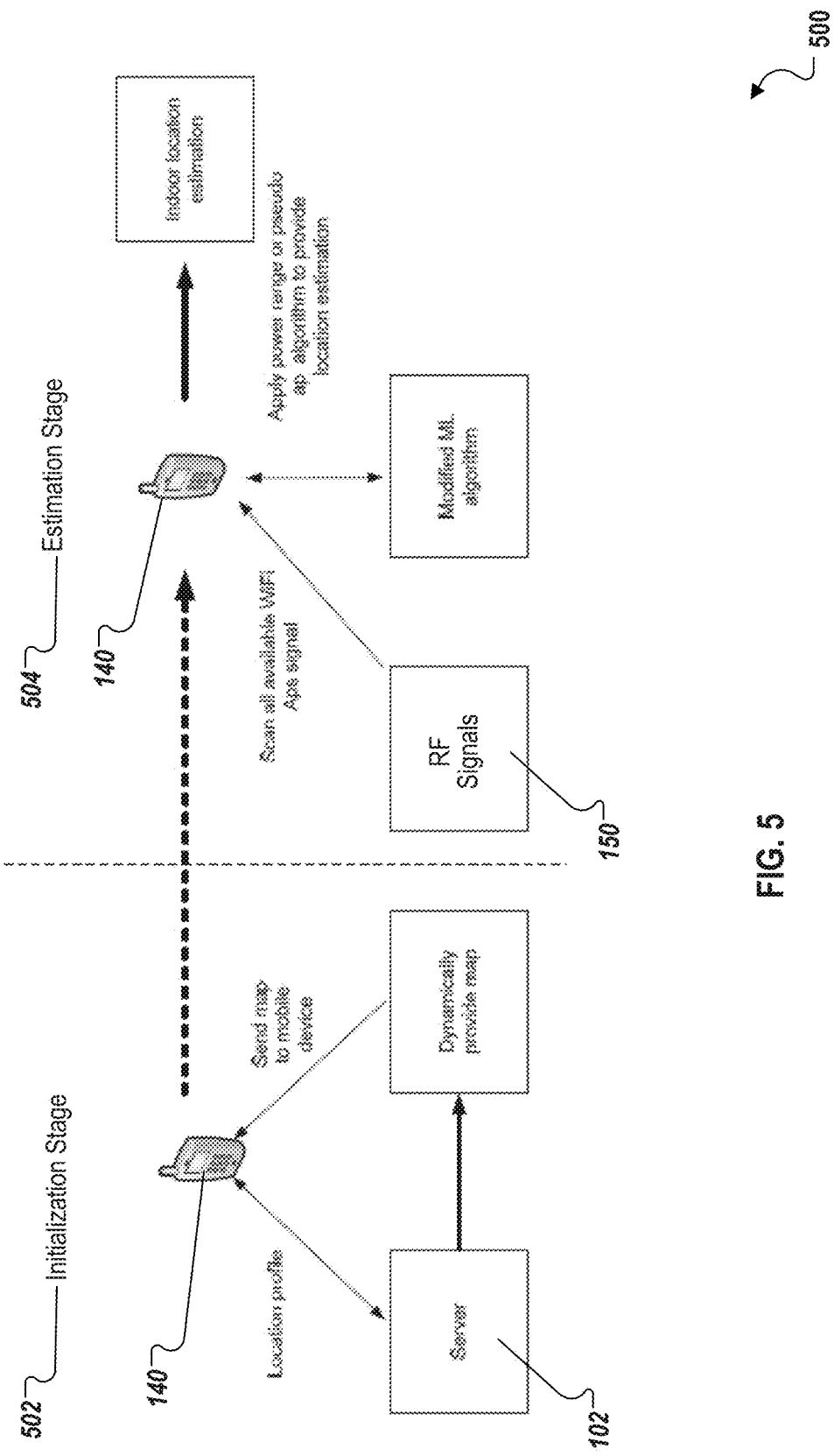
FIG. 5 is a block diagram illustrating high-level hybrid indoor location estimation system architecture and processing stages according to one implementation.

FIG. 5 is a block diagram illustrating high-level hybrid indoor location estimation system architecture and processing stages 500. The first stage of processing stage, the initialization stage 502, is typically performed on the server 102, but, in some implementations, aspects of initialization stage 502 can be performed wholly or partially on one or more UEs 140. During the initialization stage 502, indoor environment maps stored on and/or obtained by the server 102 are available to be retrieved within the requirement of a minimum time threshold. The format of the available indoor environment maps can be .jpeg, .bmp, .png, or other suitable format which can be displayed on the mobile device directly, for example on an associated GUI. As illustrated, the UE 140 can make a request for an indoor environment map from server 102. If the server 102 detects that the UE 140 is within an indoor environment, for example by a UE 140 provided location profile and/or the requested environment map being identified as an "indoor" map, the server 102 dynamically provides the requested map to the UE 140. The requested map is typically provided using a wireless data link as part of the WCS 100. In some implementations, if indoor AP location information is also available, the server 102 can notify the UE 140 that the AP location information will be preserved on the server 102 (i.e., the UE 140 should not communicate AP location information) for security purposes or the server 102 can send the known AP location information to the UE 140 for various purposes described in more detail below.

In the estimation stage 504, a real-time location estimation is performed for the UE 140 using alternative available RF signals. Once the UE 140 has loaded the environment map dynamically provided in the initialization stage, the UE 140 measures available RF signals from available detected APs and estimates a location of the UE 140 using one or more maximum likelihood (ML) estimation algorithms (described below). In some implementations, algorithms used to perform the real-time location estimation for the UE 140 can be performed on the server 102 and/or the UE 140. If the algorithm is executed on the server 102, the UE 140 can send one or more location estimation requests to the server 102 along with data needed by the server to perform the location estimation. For example, a UE 140 can send at least the measured data described in equation (1) for each detected AP to the server 102. Otherwise, the UE 140 will locally execute one or more appropriate algorithms to calculate a real-time location estimation for the UE 140. In some implementations, the server 102 and/or the UE 140 can each execute the real-time location estimation algorithms depending on one or more factors. Factors used to decide whether to run a particular real-time location estimation algorithm locally on a UE 140 or on the server 102 include UE 140 specifications (available memory, processor speed, etc.), security concerns, required response time thresholds, accuracy requirements, use of estimated location data (e.g., by emergency first responders or a shopper at a mall), and the like. In some implementations, the server 102 and/or UE 140 can execute the same estimation algorithms, different estimation algorithms, or a combination or the two.

A. Pseudo-AP Build Up

In order to minimize the impact of the bias described above in conjunction with FIG. 4B, one or more "pseudo" APs (pseudo-APs) are defined for a particular environment map and stored in a "map" as virtual beacons for use in real-time location estimations performed in the estimation stage 504. Typically, the mapped pseudo-APs are stored in a grid-type structure in relation to the environment map. In some implementations, pseudo-APs can be combined with known AP locations, if available, to improve location estimation accuracy even further.

Each pseudo-AP can be characterized by a signal statistical distribution at its location, where the signal used to calculate the statistical distribution is associated with at least one actual AP. Two conditional probability functions are used to describe a pseudo-AP containing proximate histogram probability information of at least one BSSID and associated RSSI around the BSSID.

$$\text{Pseudo AP} = \{P(\text{bssid}|\text{loc}), (\text{rssi}|(\text{bssid,loc}))\} \quad (4),$$

where loc is the location where a pseudo-AP is "virtually constructed," and BSSID/RSSI are as previously defined for equation (1). In some implementations, pseudo-APs are constructed based upon field-survey-collected data of the environment and/or vendor-provided data associated with the environment. Thus, P (bssid|loc) is the probability distribution that the actual AP BSSID is "seen" at a location loc and P (rssi|(bssid, loc)) is the radio signal strength indicator probability distribution for a specific AP at the location loc.

B. Indoor Map Grid Using Pseudo-APs

An indoor map grid is constructed using one or more pseudo-APs. The construction of an indoor map grid can be flexible depending upon characteristics of the indoor environment. For example, for a generic office, a pseudo-AP could be assigned to each of a cube, meeting room, kitchen, reception desk, laboratory, bathroom, etc. The granularity of how many pseudo-APs are assigned to a particular area is also flexible. For example, for a very large workspace, multiple pseudo-APs could be assigned to improve location estimation accuracy.

Each pseudo-AP is a function of the strength of an RF signal from an actual AP associated with the location described by an environment map. Specific rules are not necessary to construct a pseudo-AP map and, in general, a grid of pseudo-APs is sufficient. In typical implementations, four (4) pseudo-APs is the minimum number of pseudo-APs used to determine a mobile device location estimation. In some implementations, the number of pseudo-APs can be adjusted for any suitable practical consideration/criteria associated with desired accuracy, the location, type of UE 140, presence of actual APs, and the like. Other criteria that can be taken into consideration include a true AP physical location distribution, if available, and location estimation accuracy criteria. Pseudo-APs that are proximally too close or too distant degrade location estimation accuracy. In some implementations, pseudo-APs that fall outside of proximity thresholds can be removed and/or adjusted positionally with respect to a determined pseudo-AP grid with adjustments made to location estimations, if necessary, due to pseudo-AP location modifications.

C. Location Estimation using Pseudo-APs

In order to find adjacent pseudo-APs corresponding to a specific location, Bayesian theory can be used with a set of ML estimation algorithms. Here, RSSI measured at each location is considered to be a random variable with a conditional probability distribution of:

$$P(\text{RSSI}|\text{Loc}) \quad (5)$$

To estimate the probability of a UE 140 location for a given radio power level the Bayesian equation is applied.

$$P(\text{loc}|\text{rssi}) = P(\text{loc})P(\text{rssi}|\text{loc})/P(\text{rssi}) = (P(\text{loc})P(\text{rssi}|\text{loc}))/\Sigma_{i=1}^{n} P(\text{loc}_i)P(\text{rssi}|\text{loc}_i) \quad (6)$$

Equation (6) is used to calculate the location of UE 140 based upon calculated scores associated with one or more pseudo-APs.

As illustrated in equation (7), the AP probabilities distribution is then included:

$$P(\text{loc}|\text{rssi}) = P(\text{loc})P(\text{rssi}|(\text{bssid,loc}))P(\text{bssid}|\text{loc}) \quad (7)$$

The last two elements of equation (7) represent the pseudo-AP. If it is assumed that P(loc) is equal for all locations, then, according to equation (7), the final pseudo-AP location estimation is consistent with equation (4) as described above.

A compensation correction function, $\phi(\text{rssi})$, is then added into equation (7) to compensate for a typical lack of measurement data samples necessary to guarantee that the likelihood function will reflect an actual signal statistical distribution. $\phi(\text{rssi})$ is used to correct for errors introduced by physical signal path loss. Physical signal path loss can be due to, for example, distance of transmission, propagation through different materials (e.g., air, walls, water, glass, concrete, and the like), and/or or RF signal interference. Thus, equation (7) becomes:

$$P(\text{loc}|\text{rssi}) = \phi(\text{rssi})P(\text{loc})P(\text{rssi}|(\text{bssid,loc}))P(\text{bssid}|\text{loc}) \quad (8)$$

In instances where enough measurement data samples are detected, known, and/or available, the compensation correction function can be omitted.

In some implementations, it is also possible to choose between various equations to provide different compensation correction values. The choice of an appropriate compensation correction function equation depends upon the radio environment. For example, two possible compensation correction function equations for ϕ(rssi) could include, but are not limited to:

$$(rssi/rssi_{min})^\alpha \text{ or } 10^{\wedge}((rssi-rssi_{min})/10) \quad (9)$$

where alpha (α) is a weighting factor as described above. In some instances, the location estimation accuracy can be improved by adding the above-described weighting factor alpha and scaling factor beta (β) into the probability distribution of equation (8). Thus, the resultant equation (10) becomes:

$$P(loc|rssi) = \phi(rssi) P(loc) P(rssi|(bssid,loc))^\alpha P(bssid|loc)^\beta \quad (10)$$

Equation (10) provides a probability score for one pseudo-AP given a particular BSSID and corresponding RSSI measurements. In order to estimate a UE 140 location, one or more pseudo-AP scores are chosen according to a score ranking and the pseudo-AP locations averaged to provide the UE 140 estimated location. In some implementations, an average value calculation, power range algorithm, or other suitable algorithm is used to provide the estimate of the UE 140 location. In some implementations, alpha(α) and beta(β) are set to a value of one (1) by default. In some implementations, alpha(α) and beta(β) can also be tuned using a manual and/or dynamic calibration process for each particular location.

Figure 6:
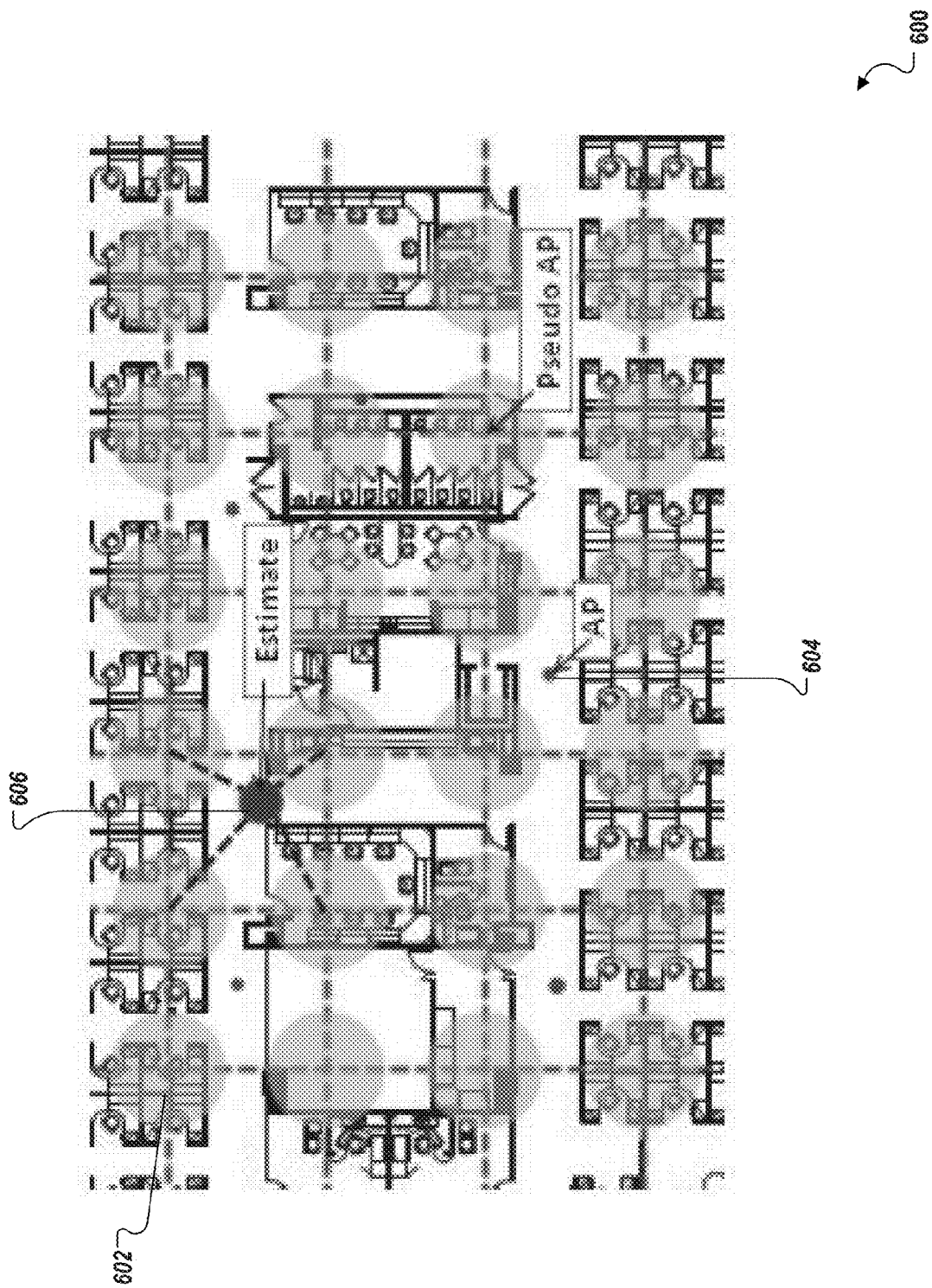
FIG. 6 illustrates the application of a grid of pseudo-APs to an environment map to provide a hybrid mobile device location estimation according to one implementation.

FIG. 6 illustrates the application of a grid of pseudo-APs to an environment map 600 in order to provide a hybrid mobile device location estimation according to one implementation. The grid of pseudo-APs may be made up of pseudo-APs similar to pseudo-AP 602. Actual APs 604 are also known. The estimated location 606 is determined, in some implementations, by an application of an average value calculation, power range algorithm, COG, or other suitable algorithms using the actual APs and/or one or more pseudo-APs associated with the pseudo-AP grid.

In some instances, a grid coordinate estimation representation may be more meaningful than a coordinate value providing a (latitude, longitude, altitude) coordinate value in order to relate a location to a named space within an indoor location. For example, a particular grid reference can be defined as an office, a conference room, a front desk reception, one or more locations bounded by specific indoor "landmarks," and other suitable grid references. Once a mobile device location estimation has been made, a grid reference containing the mobile device location estimation is identified and presented as the estimated mobile device location. In some implementations, both the initial mobile device location estimation and one or more grid references can be identified.

Figure 7:
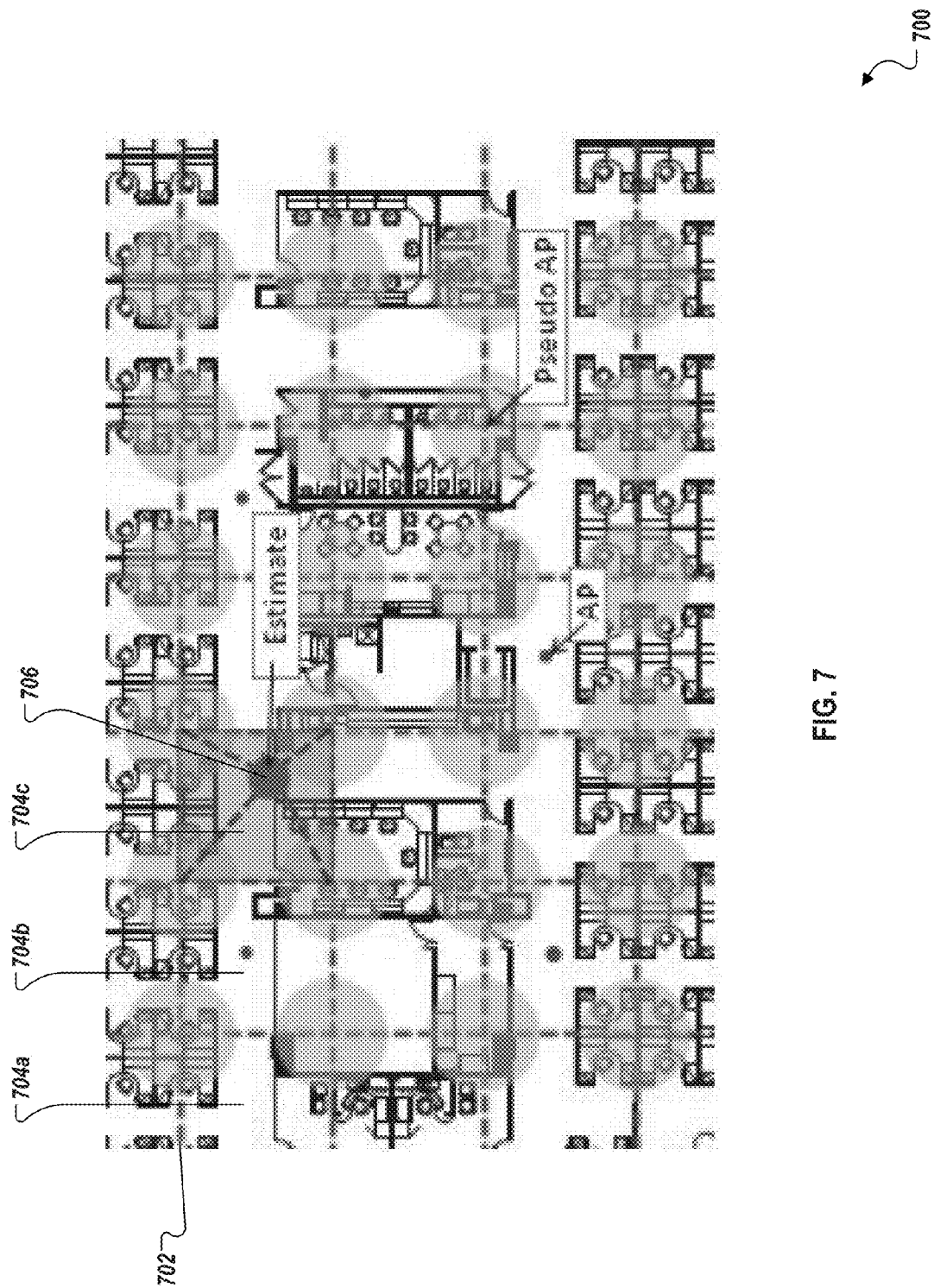
FIG. 7 illustrates a representation of a grid estimation system applied to an environment map with a pseudo-AP grid according to one implementation.

FIG. 7 illustrates a representation of a grid estimation system applied to an environment map 700 with a pseudo-AP grid according to one implementation. Grid 702 is shown as part of the environment map 700. Grid 702 contains multiple grid references, for example 704a-706c. Mobile device location estimation 706 is illustrated as being contained within grid reference 704c. As a result, grid reference 704c is identified as the estimated mobile device location. In some implementations, if a mobile device location estimation value overlaps two or more grid references, multiple grid references can be identified. In other implementations, other determination rules, algorithms, factors, and the like can be used to narrow possible grid references.

III. Exemplary Location Estimation Method

Figure 8:
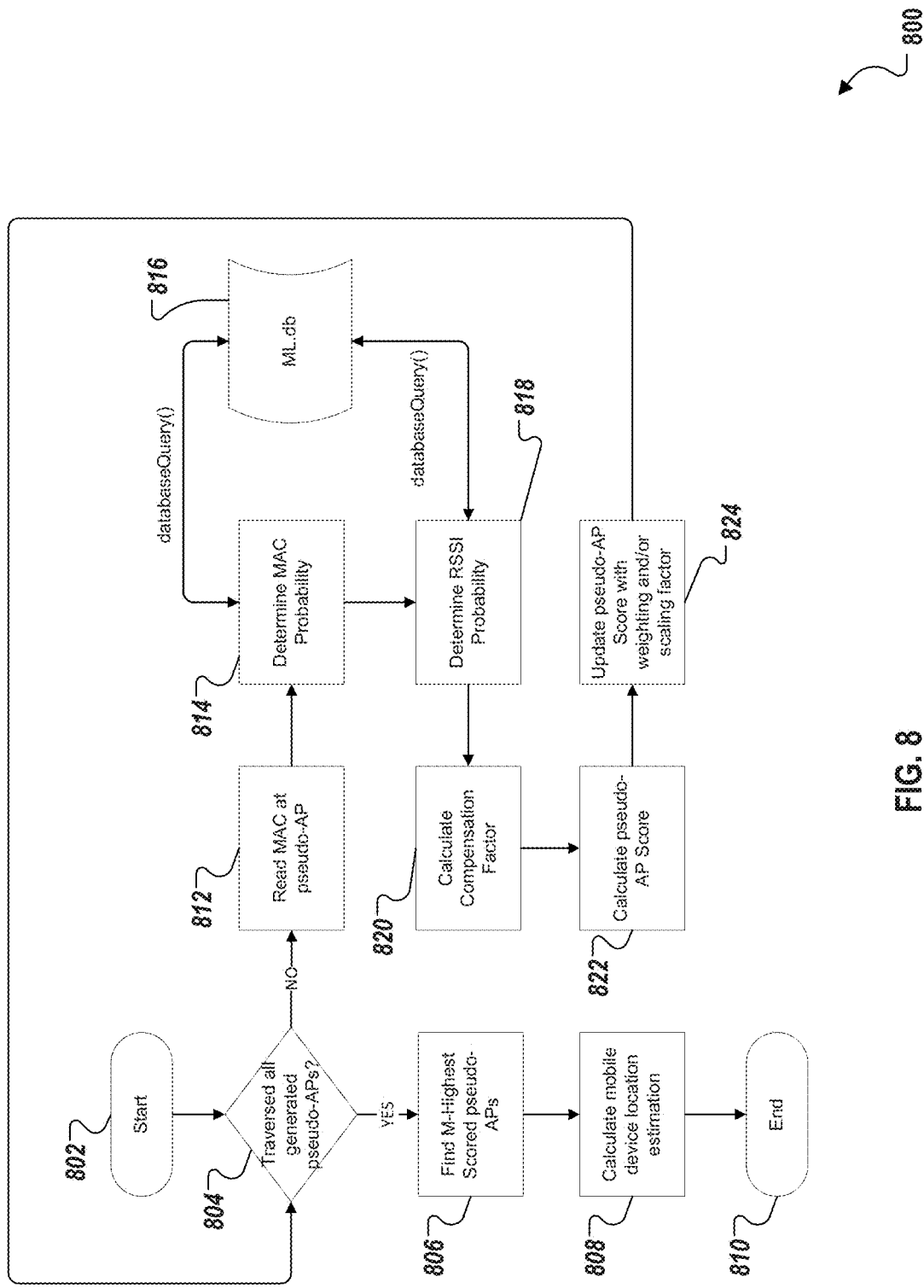
FIG. 8 is a flow chart of a method using pseudo-APs to calculate a mobile device location estimation according to one implementation.

FIG. 8 is a flow chart of a method 800 using pseudo-APs to calculate a mobile device location estimation according to one implementation. For clarity of presentation, the description that follows generally describes method 800 in the context of FIGS. 1, 2, 3, 4A-4B, and 5-7 and described equations (1)-(10). However, it will be understood that method 800 may be performed, for example, by any other suitable system, environment, software, and hardware, or a combination of systems, environments, software, and hardware as appropriate. Various steps of method 800 can be run in parallel, in combination, in loops, or in any order.

At 802, method 800 starts. From 802, method 802 proceeds to 804.

At 804, a determination is made whether each generated pseudo-AP, for example in a pseudo-AP map, have been traversed to determine an updated pseudo-AP probability score as provided by equation (10). If at 804, it is determined that all the pseudo-APs have been traversed, method 800 proceeds to 806. If, however, it is determined that all the pseudo-APs have not been traversed, method 800 proceeds to 812.

At 806, the M-highest scores of the traversed pseudo-APs are determined. Typically, M is the minimal number of pseudo-APs to be used for calculating the final mobile device location estimation. The default value for M is four (4), but M's value can be adjusted upwards or downwards in practical use to achieve a best mobile device location estimation performance. From 806, method 800 proceeds to 808.

At 808, a mobile device location estimation is calculated using an average of the M-highest score pseudo-AP locations. In some implementations, an average value calculation, power range algorithm, or other suitable algorithm is used to calculate the final mobile device location estimation. From 808, method 800 proceeds to 810 where the exemplary mobile device location estimation method 800 ends. The exemplary mobile device location estimation may be used in various applications or programs that utilize mobile device position or employ location-based functionality.

At 812, the BSSID associated with a particular pseudo-AP is read. From 812, method 800 proceeds to 814.

At 814, the BSSID probabilities (P(bssid|loc)), the probability distribution that the AP MAC address is "seen" at a location loc, are determined as in equation (4). In some implementations, the BSSID probability, is accessed from maximum likelihood (ML) database ML.db 816 through the use of a database query. In some instances, ML.db is used to store each pseudo-APs BSSID and RSSI histogram information. In other implementations, the BSSID probability is dynamically determined. From 814, method 800 proceeds to 818.

At 818, the RSSI probabilities are determined as in equation (4). In some implementations, the RSSI probability, P(rssi|(bssid, loc)), the radio signal strength indicator probability distribution for a specific AP at the location loc, is accessed from database ML.db 816 through the use of a database query. In other implementations, the RSSI probability is dynamically determined. From 818, method 800 proceeds to 820.

At 820, the compensation factor ϕ(rssi) is calculated as described in equation (9). From 820, method 800 proceeds to 822.

At 822, the pseudo-AP score is calculated according to equation (8). From 822, method 800 proceeds to 824.

At 824, the calculated pseudo-AP score is updated according to equation (10) through the use of weighting factor alpha (α) and scaling factor beta (β). For example, values for alpha and beta could be 0.2 and 0.5, respectively. In some implementations, one or the other of alpha or beta can be used. In some implementations, alpha and beta are not applicable and can be set to 1 (i.e., the pseudo-AP score remains the same as that provided by equation (8)). From 824, method 800 proceeds back to 824.

Figure 9:
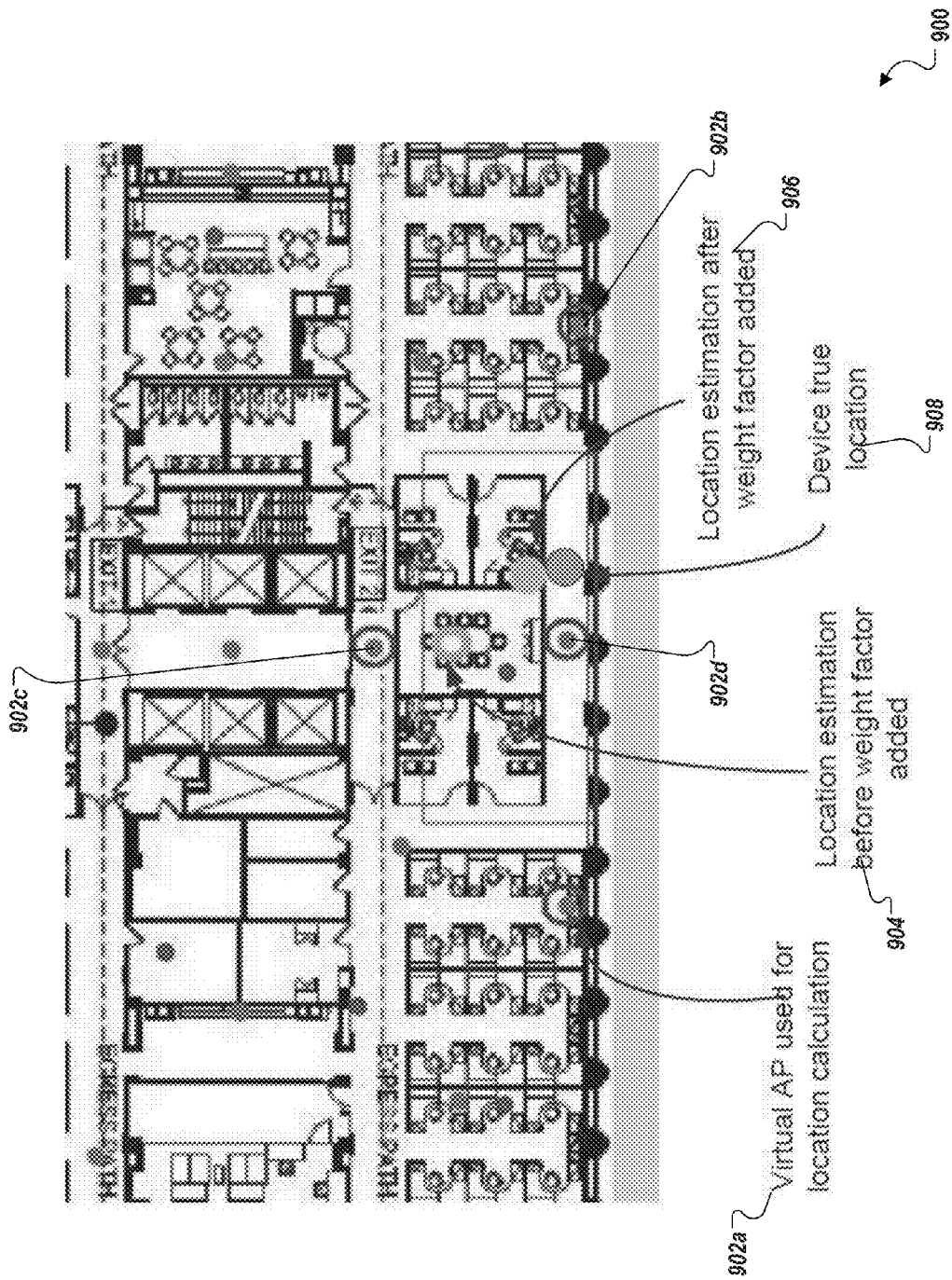
FIG. 9 illustrates the use of an adaptive weighting factor for a mobile device approaching or moving along a map border according to one implementation.

IV. Adaptive Weighting Factor Usage as Mobile Device Approaches/Moves Along a Map Border FIG. 9 illustrates the use of an adaptive weighting factor for a mobile device approaching or moving along a map border 900 according to one implementation. FIG. 9 illustrates virtual-APs 902a-902d (M=4) used for location calculation/estimation, a location estimation 904 before a weighting factor is added, a location estimation 906 after a weighting factor is added, and a mobile devices true location 908. As the mobile device 908 moves to a border of the buildings as shown in FIG. 9 (device true location 908), large estimation errors can be generated as the pseudo-APs 902a-902d used to estimate its location are no longer evenly distributed "around" the mobile device at location 908.

In these instances, historical calculated estimation data can be used to determine at least mobile device moving direction and velocity which can be utilized to improve a mobile device location estimation. An additional weighting factor can be introduced to improve the mobile device location estimation accuracy as the mobile device is moving to or along the border of the pseudo-AP grid. In some implementations, the additional weighting factor represents a function of the mobile device's last estimated location, moving direction, velocity, and/or the φ(rssi) factor as defined in equation (9). In other implementations, the additional weighting factor can utilize other suitable values consistent with the disclosure, whether historical, dynamically calculated, etc.

V. Filtering Approach

In some implementations, a recursive Kalman Filter (KF) can be used to further mobile device location estimation accuracy. The input to KF is typically output values of a COG calculation or any pseudo-AP algorithm. For a COG or pseudo-AP algorithm described above, location x can be estimated by ^x using the following methodology.

In the KF implementation, the linear stochastic differential equation is given by:

$$x_k = Ax_{k-1} + w_{k-1}, \quad (11)$$

with the measurement:

$$y_k = Cx_k + v_k, \quad (12)$$

where $x_k$ is the true location; $y_k$ is the measurement; $w_k$ and $v_k$ are the process and measurement noise, respectively; and A and C are the matrices. One obvious way of embedding our static scheme to this dynamic setup is by letting A=C=I (identity matrix). Then the usual Kalman filter (KF) algorithm can be applied to produce dynamic tracking of the location via time update (predict).

$$\hat{x}_{k|k-1} = \hat{x}_{k-1|k-1}, \quad (13)$$

$$P_{k|k-1} = P_{k-1|k-1} + Q \quad (14)$$

and measurement update (correct):

$$K_k = P_{k|k-1}(P_{k|k-1} + R)^{-1}, \quad (15)$$

$$\hat{x}_{k|k} = \hat{x}_{k|k-1} + K_k(y_k - \hat{x}_{k|k-1}), \quad (16)$$

$$P_{k|k} = (1 - K_k)P_{k|k-1}, \quad (17)$$

where $\hat{x}_{k|k-1}$ is the a priori state estimate; $\hat{x}_{k|k}$ is the a posteriori state estimate; is the a $P_{k|k-1}$ priori estimate error covariance; $P_{k|k}$ is the a posteriori estimate error covariance; Q is the variance of $w_k$; $K_k$ is the Kalman gain; and R is the variance of $v_k$. The initialization of the KF is set at $\hat{x}_{0|0} = (0,0)$ and $P_{0|0} = 1$. The parameters Q and R are used in tuning the KF.

FIG. 10 is a high-level flow chart of a method 1000 for mobile device location estimation. For clarity of presentation, the description that follows generally describes method 1000 in the context of FIGS. 1, 2, 3, 4A-4B, and 5-9 and described equations (1)-(10). However, it will be understood that method 1000 may be performed, for example, by any other suitable system, environment, software, and hardware, or a combination of systems, environments, software, and hardware as appropriate. Various steps of method 1000 can be run in parallel, in combination, in loops, or in any order.

At 1002, method 1000 starts. From 1002, method 1002 proceeds to 1004.

At 1004, a request is made to a server to load/search a storage, for example a database, for a map of known APs or a pre-generated map of pseudo-APs. From 1004, method 1000 proceeds to 1006.

At 1006, a determination is made whether the request of 1004 was successful. If at 1004, it is determined that the request of 1004 was not successful, method 1000 proceeds to 1008. If, however, it is determined that the request of 1004 was successful, method 1000 proceeds to either 1012/1020.

At 1108, an error is reported and method 1000 ends at 1010. In some implementations, the error can be reported by a GUI indication, email, text message, audio indication, and/or other suitable error indication.

Returning to 1006, if an AP map is available, method 1000 proceeds to 1012 and then to 1014 where a COG algorithm is used to calculate the mobile device location estimation. In some implementations, other suitable non-COG algorithms can be used to calculate the mobile device location estimation. From 1014, method 1000 proceeds to 1016 where the COG calculated mobile device location estimation is supplied as input to a KF. If the input is determined by the KF to be valid and KF processing performed, KF output is passed for reporting to 1018. Otherwise, the COG algorithm output is passed for reporting to 1018. From 1016, method 1000 proceeds to 1018.

At 1018, the location estimation is reported. If the estimation calculation was performed on the server, the estimation is transmitted to the UE. If the estimation was performed on the UE, the location estimation is transmitted to the server. In instances where the location estimation took place on both the UE and the server, appropriate data is transmitted to each by the other. From 1018, method 1000 proceeds to 1010 where it ends.

Returning to 1006, if a pseudo-AP map is available, method 1000 proceeds to 1020 and then to 1022 where one or more ML algorithms are used to calculate the mobile device location estimation. From 1022, method 1000 proceeds to 1016 where a KF can be applied as previously described at 1014.

As noted above, the present embodiments may provide for enhanced in-door navigation using pseudo-AP's combined with actual AP's. To remove bias when all of the real world or actual APs are one side of a mobile device, pseudo-APs may be generated for an in-door location. For instance, the pseudo-APs may be generated as a function of the probability distribution of the radio signal strength indicator (rssi) and/or the basic service set identification (bssid) for actual APs. An adaptive weight factor, based upon moving direction and speed, may be used when the mobile device is moving along a map border to enhance accuracy.

In one aspect, a pseudo Access Point may be created by analysis of signals from actual access points to form a virtual beacon. A grid of pseudo-APs may be used to form an area of improved positioning accuracy created by analysis of multiple beacon signals. Improved positioning estimation near the edges of the grid may be gained by utilizing the current velocity and heading of the mobile device based on analysis of the pseudo-APs. The present embodiments may also provide the initial position estimation for indoor navigation systems and applications.

In one embodiment, a method for in-door mobile device location estimation may be provided. The method may include constructing a pseudo-AP (Access Point) map associated with a venue (i.e., a real world location) having one or more pseudo-APs, each pseudo-AP being a function of at least the WiFi radio signal strength for an actual AP associated with the venue; and (2) estimating an in-door location of a mobile device within the venue using both (a) one or more actual APs associated with the venue, and (b) one or more pseudo-APs from the pseudo-AP map associated with the venue. Each pseudo-AP may further be a function of the BSSID or MAC address of a specific location. The method may also employ a Kalman Filtering approach for closed loop mobile device position calculation. The method may include additional, fewer, or alternate steps, including those discussed elsewhere herein.

In some aspects, a system can be used for indoor mobile device location estimation. The system can include a means for using indoor floor map, indoor WLAN AP location map and constructing a pseudo-AP map associated with an indoor location, wherein the pseudo-AP map includes at least one pseudo-AP, each pseudo-AP a function of at least a radio-frequency (RF) signal strength indication (RSSI) associated with at least one actual AP associated with the indoor location; a means for estimating a mobile device location within the boundaries of the indoor location using at least one actual AP associated with the indoor location, and at least one pseudo-AP from the pseudo-AP map associated with the indoor location; and a means for using the estimated mobile device location for indoor navigation within the indoor location.

In some implementations, the system can include a means for using the estimated mobile device location in conjunction with an environment map representing the indoor location for indoor navigation. Additionally or alternatively, the system can include a means for utilizing an additional weighting factor representing a function of at least the mobile device's last estimated location, moving direction, and velocity based upon an analysis of the at least one pseudo-AP.

In some instances, implementations may include one or more of the following features. Global Navigation Satellite System (GNSS) RF signals are unavailable. The pseudo-AP map is arranged in a grid pattern. The estimated mobile device location is calculated from a function of AP location and/or pseudo APs locations. In some cases, each pseudo-AP can be a function of a basic service set identification BSSID) associated with a particular actual AP. A pseudo-AP can be described as the probability distribution that the BSSID of the particular actual AP is at a particular location and a radio signal strength indicator probability distribution for the particular actual AP at the particular location.

In some implementations, estimating the mobile device location includes at least one of a weighting factor dependent upon and calibrated based on the indoor location environment, a scaling factor, or a compensation correction function to correct for physical signal path loss error. Additionally or alternatively, estimating the mobile device location includes using Kalman Filtering to calculate a closed loop mobile device location estimation. In some implementations, the estimated mobile device location is provided as the initial position estimation for an indoor navigation system. Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. For example, a data processing apparatus can refer to a mobile-type device, such as a tablet computer, cellular phone, or other suitable apparatus. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results Accordingly, the above description of example implementations does not define or constrain this disclosure. Other changes, substitutions, and alterations are also possible without departing from the spirit and scope of this disclosure.

What is claimed is:

1. A computer-implemented method for indoor mobile device location estimation, comprising steps of:
   using an indoor floor map and an indoor wireless local area network (WLAN) access point (AP) location map associated with an indoor location to construct a pseudo-AP map associated with the indoor location based on at least one of field-survey-collected data or vendor-provided data, wherein the pseudo-AP map includes at least one pseudo-AP, each of the at least one pseudo-AP is a function of a radio-frequency (RF) signal strength indication (RSSI) and a function of a basic service set identification (BSSID) associated with a particular actual AP associated with the indoor location, and each of the at least one pseudo-AP is described as a probability distribution that the BSSID of the particular actual AP is at a particular location and a radio signal strength indicator probability distribution for the particular actual AP at the particular location;
   receiving from a mobile device a measurement of the RSSI level of the particular actual AP;
   estimating a location of the mobile device within boundaries of the indoor location base on:
      at least one actual AP associated with the indoor location, and
      at least one pseudo-AP from the pseudo-AP map associated with the indoor location; and
   using the estimated mobile device location for indoor navigation within the indoor location.

2. The method of claim 1, the method further comprising using the estimated mobile device location in conjunction with an environment map representing the indoor location for indoor navigation.

3. The method of claim 1, wherein Global Navigation Satellite System (GNSS) RF signals are unavailable.

4. The method of claim 1, wherein the pseudo-AP map is arranged in a grid pattern.

5. The method of claim 1, wherein the estimated mobile device location is calculated from a function of AP location and/or pseudo APs locations.

6. The method of claim 1, further comprising utilizing an additional weighting factor representing a function of at least the mobile device's last estimated location, moving direction, and velocity based upon an analysis of the at least one pseudo-AP.

7. The method of claim 1, wherein the estimated mobile device location is provided as an initial position estimation for an indoor navigation system.

8. The method of claim 1, wherein the estimating the mobile device location includes at least one of a weighting factor dependent upon and calibrated based on indoor location environment, a scaling factor, or a compensation correction function to correct for physical signal path loss error.

9. The method of claim 1, wherein estimating the mobile device location includes using Kalman Filtering to calculate a closed loop mobile device location estimation.

10. A non-transitory, computer-readable medium storing computer instructions executable by a computer to perform operations comprising:
   using an indoor floor map and an indoor WLAN AP location map associated with an indoor location to construct a pseudo-access point (AP) map associated with the indoor location based on at least one of field-survey-collected data or vendor-provided data, wherein the pseudo-AP map includes at least one pseudo-AP, each of the at least one pseudo-AP is a function of a radio-frequency (RF) signal strength indication (RSSI) and a function of a basic service set identification (BSSID) associated with a particular actual AP associated with the indoor location, and each of the at least one pseudo-AP is described as a probability distribution that the BSSID of the particular actual AP is at a particular location and a radio signal strength indicator probability distribution for the particular actual AP at the particular location;
   receiving from a mobile device a measurement of the RSSI level of the particular actual AP;
   estimating a location of the mobile device within boundaries of the indoor location base on:
      at least one actual AP associated with the indoor location, and
      at least one pseudo-AP from the pseudo-AP map associated with the indoor location; and
   using the estimated mobile device location for indoor navigation within the indoor location.

11. A system, comprising:
   a memory;
   at least one computer interoperable coupled with the memory and configured to:
      use an indoor floor map and an indoor WLAN AP location map associated with an indoor location to construct a pseudo-access point (AP) map associated with the indoor location based on at least one of field-survey-collected data or vendor-provided data, wherein the pseudo-AP map includes at least one pseudo-AP, each of the at least one pseudo-AP is a function of a radio-frequency (RF) signal strength indication (RSSI) and a function of a basic service set identification (BSSID) associated with a particular actual AP associated with the indoor location, and each of the at least one pseudo-AP is described as a probability distribution that the BSSID of the particular actual AP is at a particular location and a radio signal strength indicator probability distribution for the particular actual AP at the particular location;
      receive from a mobile device a measurement of the RSSI level of the particular actual AP;
      estimate a location of the mobile device within boundaries of the indoor location base on:
         at least one actual AP associated with the indoor location, and
         at least one pseudo-AP from the pseudo-AP map associated with the indoor location; and
      use the estimated mobile device location for indoor navigation within the indoor location.

12. The system of claim 11, wherein the at least one computer interoperable is further configured to use the estimated mobile device location in conjunction with an environment map representing the indoor location for indoor navigation.

13. The system of claim 11, wherein Global Navigation Satellite System (GNSS) RF signals are unavailable.

14. The system of claim 11, wherein the pseudo-AP map is arranged in a grid pattern.

15. The system of claim 11, wherein the estimated mobile device location is calculated from a function of AP location and/or pseudo APs locations.

16. The system of claim 11, wherein the at least one computer interoperable is further configured to utilize an additional weighting factor representing a function of at least the mobile device's last estimated location, moving direction, and velocity based upon an analysis of the at least one pseudo-AP.

17. The system of claim 11, wherein the estimated mobile device location is provided as an initial position estimation for an indoor navigation system.

18. The system of claim 1, wherein estimating the mobile device location includes at least one of a weighting factor dependent upon and calibrated based on indoor location environment, a scaling factor, or a compensation correction function to correct for physical signal path loss error.

19. The system of claim 11, wherein estimating the mobile device location includes using Kalman Filtering to calculate a closed loop mobile device location estimation.

* * * * *

UNITED STATES PATENT AND TRADEMARK OFFICE
CERTIFICATE OF CORRECTION

| | | |
|---|---|---|
| PATENT NO. | : 9,121,931 B2 | Page 1 of 1 |
| APPLICATION NO. | : 13/838516 | |
| DATED | : September 1, 2015 | |
| INVENTOR(S) | : Jingwei Xu et al. | |

It is certified that error appears in the above-identified patent and that said Letters Patent is hereby corrected as shown below:

IN THE CLAIMS

Column 19, Line 37, In Claim 1, delete "base on:" and insert -- based on: --, therefor.

Column 20, Line 27, In Claim 10, delete "base on:" and insert -- based on: --, therefor.

Column 20, Line 57, In Claim 11, delete "base on:" and insert -- based on: --, therefor.

Column 21, Line 17, In Claim 18, delete "claim 1," and insert -- claim 11, --, therefor.

Signed and Sealed this
First Day of March, 2016

Michelle K. Lee
*Director of the United States Patent and Trademark Office*